June 25, 1957 W. T. PEIRCE 2,797,344
DE-ICING APPARATUS FOR ELECTRIC CABLES
Filed Dec. 10, 1954
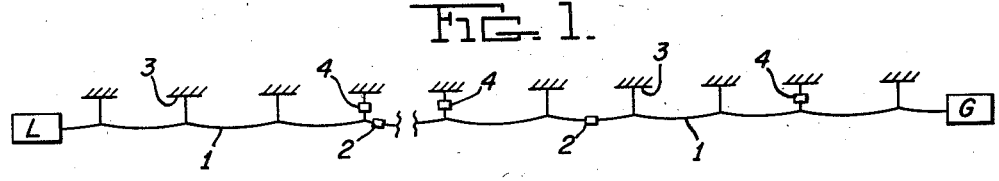
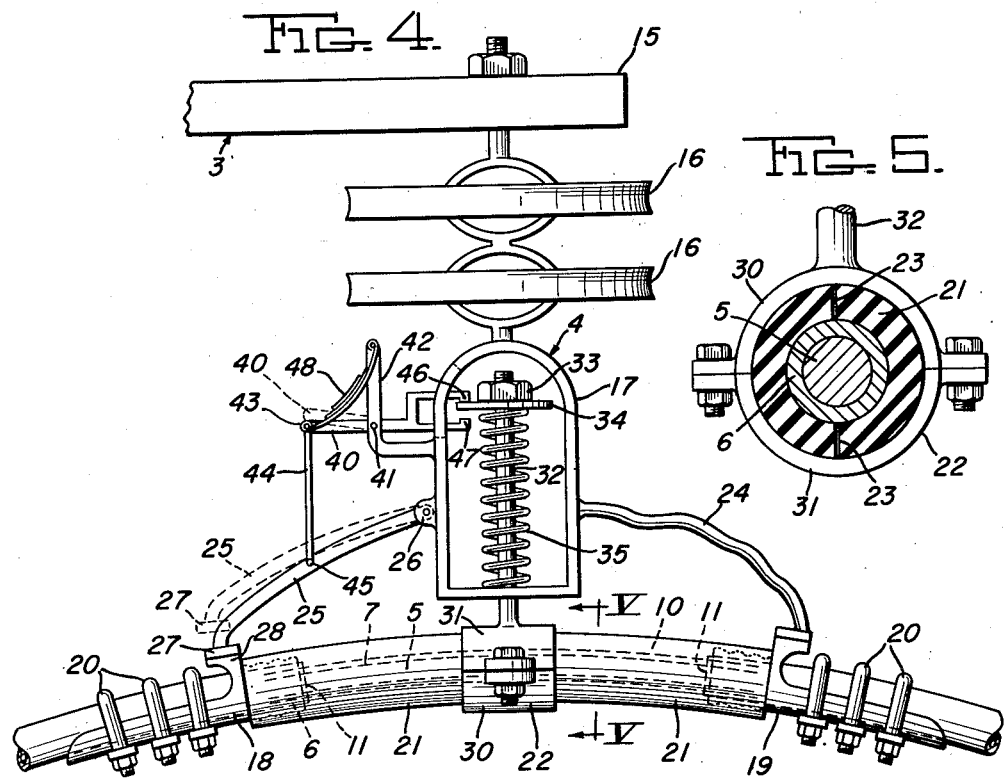
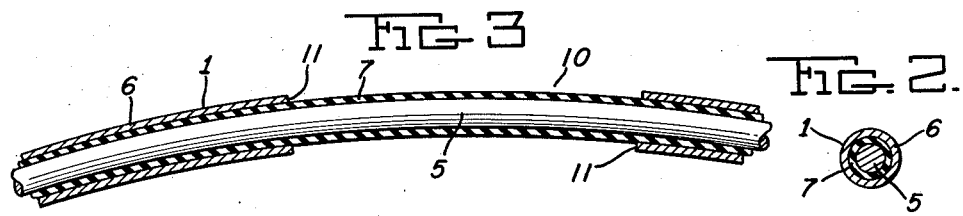
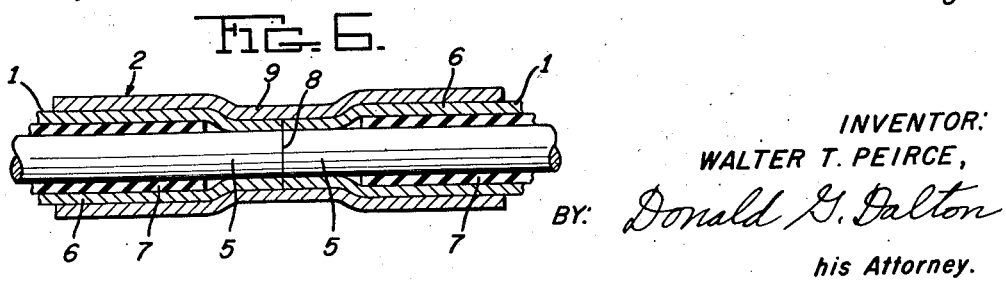
INVENTOR:
WALTER T. PEIRCE,
BY: Donald G. Dalton
his Attorney.

United States Patent Office 2,797,344
Patented June 25, 1957

2,797,344

DE-ICING APPARATUS FOR ELECTRIC CABLES

Walter T. Peirce, Worcester, Mass., assignor to United States Steel Corporation, a corporation of New Jersey Application December 10, 1954, Serial No. 474,489

13 Claims. (Cl. 307—147)

This invention relates to electric power transmission lines of the type having provisions for melting snow and ice during freezing weather and, more particularly, is directed to and includes a mechanism in the nature of an insulated cable support for automatically operating its cable ice melting provisions in response to a predetermined accumulation of ice and snow on a cable supported thereby. In addition, this invention is directed to a specific cable structure for use with a cable support and operating mechanism of the character referred to.

In areas subject to freezing temperatures, relatively expensive cable and supporting tower constructions are required to withstand excessive loading conditions due to occasional accumulations of ice and snow. One of the principal objects of this invention is to provide a transmission line in which excessive accumulations of ice and snow are prevented to thereby enable the use of lighter and less expensive cable and supporting tower constructions. For this purpose, a transmission line is provided in which the load is normally transmitted over parallel circuits provided by a pair of conductors connected in parallel and insulated from each other and, when icing conditions are encountered, the load carrying circuit through one of the conductors is opened so that the other or remaining conductor is forced to carry all of the load on the line. The resistances of the conductors are so related to the line load that sufficient heat for melting the accumulated ice is generated when the entire load of the line is carried by a single conductor. In a manner to be described, the parallel load carrying circuits have shunting connections at spaced intervals along the length of the line which are respectively located at the ends of adjacent cable sections and which are utilized conveniently to connect such ends together. The provision of shunting connections of this character enables the circuit to be opened through one of the conductors over only a portion of the length of the transmission line without interfering with the normal operation of the remainder of the line so that the cable heating provisions are brought into operation only in those areas in which icing conditions of a predetermined character are encountered.

A further object of the invention is to provide a dual conductor cable of the character referred to with a circuit control mechanism for automatically opening the circuit through one of its conductors in response to the accumulation thereon of a predetermined weight of ice or snow.

Another object of this invention is to provide a circuit control mechanism for dual conductor cables which is in the nature of a resilient cable support and which is operated in response to a predetermined resilient deflection by a predetermined quantity of ice or snow accumulating on the cable.

Still another object of the invention is to provide a transmission line system comprised of a plurality of sections of dual conductor cables of the character referred to with splicing connections joining the ends of adjacent sections and providing a shunting connection between the pairs of conductors in the connected cable sections.

A further object is to provide a multiple section cable transmission line of the character just referred to in which each of the cable sections has an ice responsive circuit control mechanism for opening one of its conductors and, more particularly, in which such mechanism includes a resilient support for the cable.

Other objects and advantages of the invention will become apparent from the following description.

In the drawings, there is shown a preferred embodiment of the invention. In this showing:

Figure 1 is a diagrammatic illustration of a transmission system constructed in accordance with the principles of this invention;

Figures 2 and 3 respectively are transverse and longitudinal sectional views illustrating diagrammatically the essential structure of the cable used in the system of Figure 1;

Figure 4 is an enlarged elevational view of one of the circuit controlling cable supports used in the system of Figure 1;

Figure 5 is a sectional view taken substantially along the line V—V of Figure 4; and Figure 6 is a longitudinal sectional view showing diagrammatically the essential structure of a splicing connection for the ends of the cables in the system of Figure 1.

In Figure 1 of the drawings, a transmission line for conducting electric power from a generator G to a load L is shown diagrammatically. The line L is formed of a plurality of lengths or sections of cable 1 having adjacent ends connected together by splicing and shunting connections 2 of a character to be referred to. Each of the cable sections 1 has conventional supports 3 on poles or towers at spaced intervals along its length. One of the supports 3 for each cable section includes a circuit controlling mechanism 4 also of a character to be referred to.

Each of the cable sections 1 is a dual conductor cable having a pair of load carrying conductors therein. As shown in Figures 2 and 3, the cable has an inner conductor 5 and a hollow or annular outer conductor 6 arranged concentrically with respect to the inner conductor 5. An annular layer of insulation 7 separates the conductors 5 and 6 from each other. While the conductors 5 and 6 are illustrated respectively as being comprised of solid metal sections, it will be understood that their showing in the drawings is diagrammatic and that these elements may be fabricated from strands of conducting wire or strap. The inner conductor may be a solid wire as shown, a stranded wire cable or a hollow core conductor. The insulation 7 may be any of the conventional wire insulating materials or may be asbestos or glass taped or felted around the conductor. The outer conductor 6 may be a layer of wires or flat metal tapes wrapped around the insulation 7.

The manner in which the ends of adjacent cable sections 1 are joined together by the connectors 2 will be best understood by referring to Figure 6. In this showing, the ends of adjacent cable sections terminate and are in abutting engagement along the line 8 and, prior to making the connection, a portion of the insulation 7 between the conductors 5 and 6 is removed inwardly from the ends of each cable section. After removal of the insulation 7 in this manner, the ends of the cable sections 1 are inserted in a metal connecting sleeve 9 to a position in which they have abutting engagement along the line 8 as illustrated. The sleeve 9 is then tightened on the cables 1 in any convenient manner as by swaging to form a mechanical connection between the cable ends and to press the conductors 5 and 6 into good electrical contact with each other and with the outer conductor 6 in good electrical contact with the inner surface of the connecting sleeve 9 so that the sleeve 9 will form an electrical bridge for both conductors if good contact is not had along the line 8. In this manner, the connections 2 provide a shunting connection between the parallel circuits provided by the conductors 5 and 6 as well as a mechanical and electrical connection therebetween. It will of course be understood that Figure 6, although diagrammatic, shows only one form of connection suitable for the purposes of this invention and that other forms of connectors are contemplated.

As indicated above, a plurality of supports 3 are provided at spaced intervals along the cable sections 1, each of which includes conventional insulated hangers from which the cable is suspended in a conventional manner. After the poles or towers forming a part of the supports 3 are erected, the power line is assembled by pulling the cable sections 1 into position for suspension from the supports 3 in the usual manner and by providing splicing connections 2 for their ends as described above. The lengths of the cable sections 1 may vary between 2000 and 5000 feet according to the size of cable and the load to be carried thereby, and the number of supports 3 for each section will be dependent on its length. As further indicated above, each cable section 1 is provided with a circuit controlling mechanism or support 4 at one of the supporting points 3 along its length.

At the point along its length where it is suspended from a support 3 having a circuit controlling mechanism 4, each cable section 1 has its outer conductor 6 removed as shown in Figure 3 over a length of about three inches to provide a gap or interruption 10 in the circuit of such outer conductor between the points 11. During normal operation, the points 11 are electrically connected by the mechanism 4 which functions as an electrical bridge.

The support 3 having the circuit control mechanism 4, as best shown in Figures 4 and 5, comprises a pole or tower supporting arm 15 from which is hung an insulator assembly having a number of insulators 16 dependent upon the voltage of the line supported thereby. The control mechanism 4 is suspended from the lower end of the assembly 16 and includes a metal housing 17 which forms a part of the electrical bridge between the points 11. The electrical bridge between the points 11 includes a switch to be described for rendering it inoperative as a bridge and a mechanism also to be described for operating the switch in response to the weight of ice and snow accumulating on the cable.

The electrical bridge between the points 11 includes saddles 18 and 19, of identical construction and formed of conducting metal, which are clamped to the ends of the conductor 6 adjacent the points 11 by U bolt clamps 20. An insulating sleeve 21 extends between and is secured to the saddles 18 and 19 and is received in a supporting collar 22 as best shown in Figure 5. As also shown in Figure 5, the sleeve 21 is formed in two parts, the inner surfaces of which face and abut along the line 23, to facilitate its mounting on the cable 1. The saddles 18 and 19 secured to the ends of the sleeve 21 are similarly formed in two parts to facilitate their assembly on the cable 1. The saddle 19 is electrically connected with the housing 17 by a flexible conductor lead 24 while a metal conducting arm 25 provides an electrical connection for the other saddle 18 with the housing 17. The arm 25 has a pivotal connection at 26 with the housing 17 and mounts a movable contact 27 at its other end for engagement with a stationary contact 28 carried by the saddle 18. The contacts 27 and 28 form an electric switch, the closed position of which is shown in solid lines and the open position of which is shown in dotted lines. The contacts 27—28, when in closed position as shown in Figure 4, complete a bridging circuit across the gap 10 in the conductor 6, such bridging circuit being comprised of the saddles 18 and 19, the conductor arms 24 and 25, and the housing 17.

The collar 22 forms part of a support for suspending the cable 1 from the housing 17. As shown in Figure 5, the collar 22 is formed of upper and lower parts 30 and 31 which are bolted together in clamping engagement with the center portion of the insulating sleeve 21. The upper part 31 is connected with a pin 32 having a nut 33 at its upper end for limiting upward movement of a washer 34 by which it is supported on the upper end of a spring 35, the lower end of the spring 35 being supported by the housing 17 so that it provides a resilient support for the pin 32 and thereby the cable 1. As ice or snow accumulates on the cable 1, the spring 35 is compressed and the washer 34 is moved downwardly to open the contacts 27—28 and to interrupt the bridging circuit for the gap 10 in a manner to be described.

The mechanism for pivoting the arm 25 to open the contacts 27 and 28 and thus interrupt the bridging circuit across the gap 10 in the conductor 6 includes an operating lever 40 pivoted at 41 to a stationary lug 42 of L-shape projecting outwardly from the housing 17. The outer end of the lever 40 has a pivotal connection at 43 to an operating rod 44, the lower end of which is pivotally connected at 45 to the switch operating arm 25. The inner end of the operating lever is bifurcated to provide two arms 46 and 47 which straddle the washer 34 and extend through an opening or slot in the side of the housing 17. A spring 48 biases the pivotal movement of the lever 40 in a counter-clockwise direction and through the rod 44 and arm 25 provides a bias for maintaining the contacts 27—28 engaged so that the bridging circuit provided by the mechanism 4 is effective to bridge the gap 10 in the conductor 6.

Under icing conditions, the weight of ice or snow collecting on the cable 1 exerts a force which moves the collar 22 and pin 32 downwardly to compress the spring 35. As compression of the spring 35 takes place, the collar 34 is moved downwardly to a position in which it engages the arm 47 and, as continued downward movement of the washer 34 takes place, the operating lever 40 is pivoted against the biasing action of the spring 48 to elevate the rod 44 and thereby pivot the arm 25 in a clockwise direction about its pivot 26 to the position shown in dotted lines. Clockwise pivotal movement of the arm 25 in this manner will be effective to disengage the contacts 27—28 and interrupt the bridging circuit for the conductor 6. Interruption of this bridging circuit by opening of the switch contacts 27 and 28 causes the load normally carried by the conduit 6 to be transferred to the conduit 5. The additional load on the conduit 5 generates heat for melting the ice and snow accumulated on the cable section 1 which will then move upwardly under the action of its resilient supporting frame 35 to enable closure of the bridging circuit contacts 27—28 by the biasing spring 47. While the contacts 27—28 and the pivotal arm 25 provide one form of switch for opening the bridging circuit for the gap 10, it will be understood that other forms of conventional switches and motion responsive operating mechanism therefor are contemplated.

From the foregoing, it will be apparent that the electric load transmitting line of this invention comprises a plurality of cable sections 1 connected at their ends to provide parallel circuits 5 and 6 over both of which the line load is normally carried. The cable connections 2 provide shunting connections in the circuits 5 and 6 so that if one of such circuits is opened in any one of the cable sections 1 both circuits will remain effective in the other cable sections. By providing an ice responsive circuit control 4 in each section 1 it will be noted that the system provides for operation of the cable de-icing provisions in only such sections as may be required by icing conditions. Attention is particularly directed to the fact that opening and closing operations of the bridging circuits through the control supports 4 are effected without the necessity of manual supervision.

While one embodiment of my invention has been shown and described it will be apparent that other adaptations and modifications may be made without departing from the scope of the following claims.

I claim:

1. In a power transmission line, a cable having a pair of conductors insulated from each other, one of said conductors having a gap therein, an electrical bridge across said gap, means in said bridge operable to render it inoperative, and means responsive to ice accumulating on said cable for operating said bridge means.

2. In a power transmission line, a cable having a pair of conductors insulated from each other and respectively operable to carry a portion of the total line load, one of said conductors being interrupted and having end portions defining a gap therebetween, an electrical bridge having connections with said end portions and providing a bridging circuit across said gap, said bridge including means operable to interrupt said bridging circuit, and means responsive to ice accumulating on said cable for operating said bridge means to open said bridging circuit and thereby transfer the load carried by said one conductor to the other of said conductors.

3. The invention defined in claim 2 characterized by said bridge means comprising a normally closed switch in said bridging circuit which is opened by said ice responsive means.

4. The invention defined in claim 2 characterized by said responsive means comprising a stationary support, a cable support having supporting engagement with said cable and being mounted for downward movement relative to said stationary support, a spring biasing said cable support against downward movement, and means for operating said bridge means in response to a predetermined downward movement of said cable support against the action of said biasing spring.

5. An apparatus for controlling the de-icing operation of a power transmission cable having a pair of conductors connected in parallel and insulated from each other, by opening the circuit through one of the conductors to thereby transfer its load to the other comprising an electrical bridge connected in series with said one conductor at spaced points defining a gap therebetween, said bridge including a normally closed switch rendering it operative to electrically bridge said gap, and means responsive to the weight of ice accumulating on said cable for operating said switch to open position.

6. An apparatus for controlling the de-icing operation of a power transmission cable having a pair of conductors connected in parallel and insulated from each other, by opening the circuit through one of the conductors to thereby transfer its load to the other comprising a suspension support for said cable including a stationary support, a cable support having supporting engagement with said cable and being mounted for downward movement relative to said stationary support, and a spring biasing said cable support against downward movement and being compressible by the weight of the cable supported thereby, an electrical bridge connected in series with said one conductor at spaced points defining a gap therebetween, said bridge including a normally closed switch rendering it operative to electrically bridge said gap, and means responsive to compression of said spring and downward movement of said cable support by the weight of ice accumulating on said cable for operating said switch to open position.

7. An apparatus for controlling the de-icing operation of a power transmission cable having a pair of conductors connected in parallel and insulated from each other, by opening the circuit through one of the conductors to thereby transfer its load to the other comprising a suspension support for said cable including a stationary support, a cable support having supporting engagement with said cable and being mounted for downward movement relative to said stationary support, and a spring biasing said cable support against downward movement and being compressible by the weight of the cable supported thereby, an electrical bridge connected in series with said one conductor at spaced points defining a gap therebetween, said bridge having as its center portion said stationary support, and a normally closed switch including a pair of relatively movable contacts respectively connected electrically with said stationary support and with one of said gap defining points in said one conductor, means for moving said contacts relatively to each other to open said switch, and means responsive to compression of said spring and downward movement of said cable support relative to said stationary support by the weight of ice accumulating on said cable for operating said contact moving means.

8. In a power transmission line, a cable formed of a plurality of similar cable sections respectively having a pair of conductors electrically insulated from each other, splicing connections joining the ends of adjacent cable sections and respectively providing an electrical shunting connection with which the ends of the pairs of conductors in adjacent cable sections are electrically connected, one of said conductors in each of said sections having a gap therein, an electrical bridge across each of said gaps, separate means in each of said bridges respectively operable to render it inoperative, and means responsive to ice accumulating on any one of said cable sections for operating the bridge means of the electrical bridge located in said one section.

9. In a power transmission line, a cable formed of a plurality of similar cable sections respectively having a pair of conductors electrically insulated from each other, splicing connections joining the ends of adjacent cable sections and respectively providing an electrical shunting connection with which the ends of the pairs of conductors in adjacent sections are electrically connected, one of said conductors in each of said cable sections being interrupted and having end portions defining a gap therebetween and an electrical bridge having connections with said end portions and providing a bridging circuit across said gap, said bridging circuit including a normally closed switch rendering it operative to electrically bridge said gap, and means responsive to the weight of ice accumulating on any one of said cable sections for operating the bridge switch therein to open position.

10. In a power transmission line, a cable formed of a plurality of similar cable sections respectively having a pair of conductors electrically insulated from each other, and splicing connections joining the ends of adjacent cable sections, each of said splicing connections providing an electrical shunting connection with which the ends of the pairs of conductors in adjacent cable sections joined thereby are electrically connected.

11. In a power transmission line, a cable formed of a plurality of cable sections, each of said cable sections comprising an inner conductor and an outer conductor with the outer conductor providing an electrical conducting path arranged concentrically with respect to the inner conductor, and an annular layer of insulation separating said inner conductor from said outer conductor, splicing connections joining the ends of adjacent cable sections and respectively providing an electrical shunting connection with which the ends of the inner and outer conductors in adjacent cable sections are electrically connected.

12. The invention defined in claim 11 characterized by the outer conductor in each of said sections being interrupted and having end portions defining a gap extending axially thereof at a point intermediate its ends, an electrical bridge having connections with said end portions and providing a bridging circuit across said gap, said bridging circuit including a normally closed switch rendering its operative, and means responsive to the weight of ice accumulating on the cable for operating said switch to open position.

13. In a power transmission line, a cable comprising a pair of similar cable sections respectively having a pair of conductors electrically insulated from each other, and a splicing connection joining adjacent ends of said cable sections and providing an electrical shunting connection with which the ends of the pairs of conductors in said cable sections joined thereby are electrically connected.

References Cited in the file of this patent

UNITED STATES PATENTS

| | | |
|---|---|---|
| 2,075,073 | Watson | Mar. 30, 1937 |
| 2,081,803 | Ell | May 25, 1937 |

FOREIGN PATENTS

| | | |
|---|---|---|
| 46,749 | Sweden | Mar. 11, 1918 |